(12) United States Patent
Horgen (10) Patent No.: US 10,077,009 B2
(45) Date of Patent: Sep. 18, 2018

(54) TOOL CARRIER AND METHOD OF USE

(71) Applicant: Craig Koefod, Ashby, MN (US)

(72) Inventor: Lindsay N. Horgen, Fergus Falls, MN (US)

(73) Assignee: Craig Koefod, Ashby, MN (US)

( * ) Notice: Subject to any disclaimer, the term of this patent is extended or adjusted under 35 U.S.C. 154(b) by 37 days.

(21) Appl. No.: 15/211,982

(22) Filed: Jul. 15, 2016

(65) Prior Publication Data

US 2017/0203702 A1    Jul. 20, 2017

Related U.S. Application Data

(63) Continuation-in-part of application No. 29/505,715, filed on Jan. 14, 2016, now Pat. No. Des. 803,036.

(51) Int. Cl.
| | |
|---|---|
| *B60R 7/00* | (2006.01) |
| *B60R 11/06* | (2006.01) |
| *B60R 11/00* | (2006.01) |

(52) U.S. Cl.
CPC ....... *B60R 11/06* (2013.01); *B60R 2011/0052* (2013.01); *B60R 2011/0059* (2013.01)

(58) Field of Classification Search
CPC ..... B60R 2011/0052; B60R 2011/0059; B60R 11/06
USPC ......................................... 224/405, 546, 913
See application file for complete search history.

(56) References Cited

U.S. PATENT DOCUMENTS

| | | | | |
|---|---|---|---|---|
| 2,220,234 | A | * | 11/1940 | Hadaway ............... A01K 97/10 248/316.5 |
| 3,581,231 | A | | 5/1971 | Freiberg |
| D256,216 | S | | 8/1980 | Van Horn et al. |
| 4,901,966 | A | * | 2/1990 | Mefferd .................. H01S 3/076 248/299.1 |
| 4,938,403 | A | * | 7/1990 | Cortelli ..................... B60R 9/00 211/105.1 |
| 5,249,722 | A | * | 10/1993 | Horn .......................... B60R 7/14 211/64 |
| 5,595,333 | A | | 1/1997 | Boston |
| 5,836,402 | A | | 11/1998 | Jones |
| 6,889,779 | B2 | | 5/2005 | Skarlupka et al. |
| D511,298 | S | | 11/2005 | Layne et al. |
| D512,893 | S | | 12/2005 | Cowan |
| 7,559,444 | B1 | * | 7/2009 | Church ..................... B60R 7/14 224/401 |

(Continued)

OTHER PUBLICATIONS

"Jaws of Ice Product Information", Excel-Outdoors, posted Mar. 23, 2016, http://excel-outdoors.com/products/jaws-of-ice-auger-carrier.

(Continued)

*Primary Examiner* — Derek Battisti
(74) *Attorney, Agent, or Firm* — Law Office of Mark Brown, LLC; Christopher M. DeBacker (57) ABSTRACT

A tool carrier for use with ATVs, snow mobiles, and other similar vehicles. The tool carrier allows for quick storage or removal of the tool from the vehicle for use. A preferred embodiment of the present invention is intended to hold an ice auger by the auger rod, however any tool with a long rod-like portion could be held using the carrier. Clamp assemblies automatically disengage a clamp from the tool when a pull is disengaged from the clamp, and are automatically locked in place by the pull when the clamp is manually reset.

2 Claims, 7 Drawing Sheets

(56) References Cited

U.S. PATENT DOCUMENTS

| | | | |
|---|---|---|---|
| 8,397,835 B1 | 3/2013 | Lyngaas | |
| 8,444,034 B2 * | 5/2013 | Bennett | B60R 7/14 |
| | | | 211/64 |
| 9,127,509 B2 | 9/2015 | Robinson et al. | |
| 9,725,290 B2 * | 8/2017 | Fahldiek | B67C 3/242 |
| 2002/0060232 A1 * | 5/2002 | Stenger | B60R 7/14 |
| | | | 224/401 |
| 2010/0224746 A1 | 9/2010 | Johnson et al. | |
| 2010/0308093 A1 | 12/2010 | Johnson | |
| 2014/0048662 A1 | 2/2014 | Ferris | |

OTHER PUBLICATIONS

"Rigging Your Ride for Success", Excel-Outdoors, posted Mar. 23, 2016, http://excel-outdoors.com/blog/news/117442372-rigging-your-ride-for-success.

* cited by examiner

TOOL CARRIER AND METHOD OF USE

CROSS-REFERENCE TO RELATED APPLICATION

This application is a continuation-in-part of and claims priority in U.S. Design patent application No. 29/505,715, filed Jan. 14, 2016, which is incorporated herein by reference.

BACKGROUND OF THE INVENTION

1. Field of the Invention

The present invention relates generally to a tool carrier and method for use thereof, and more specifically to a tool carrier for carrying an ice auger or similar tool while mounted to a vehicle, such as a snowmobile or all-terrain vehicle (ATV) for quick engagement and disengagement with the tool.

2. Description of the Related Art

Existing tool mounts for all-terrain vehicles (ATVs), snowmobiles, and the like are simple devices which typically use a simple holding bracket which does not secure the tool to the mount, or more complicated devices which include straps, latches, and other connecting elements which take a lot of time to unhook when using the tool and to reconnect when the tool is being stored. What is needed is a simple yet secure mounting rack for an ice auger or other tools for use with standard ATVs, snow mobiles, and other vehicles.

Heretofore there has not been available a system or method for tool carrier with the advantages and features of the present invention.

BRIEF SUMMARY OF THE INVENTION

The present invention generally provides a tool carrier for use with ATVs, snow mobiles, and other similar vehicles. The tool carrier allows for quick storage or removal of the tool from the vehicle for use. The preferred embodiment of the present invention is intended to hold an ice auger by the auger rod; however, any tool with a long rod-like portion could be held using the carrier.

The carrier is constructed from a base tube and two clamp assemblies fastened to either end of the base tube. The clamp assemblies include pull locks which lock or unlock the clamps to receive or release, thereby allowing the tool to be placed into the clamps or removed from the clamps as needed.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Tool Carrier 2

Figure 1:
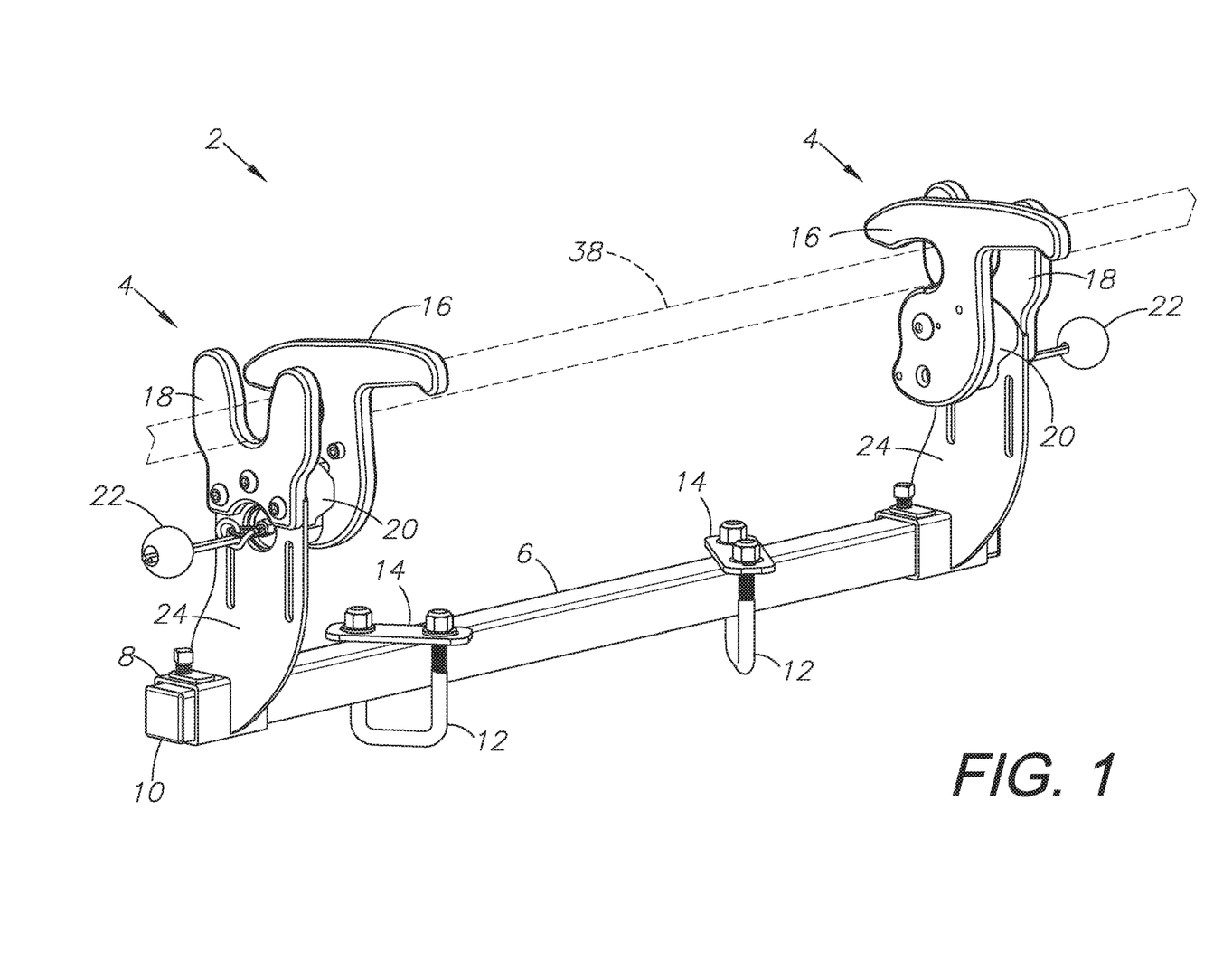
FIG. 1 is a three-dimensional isometric view of a preferred embodiment of the present invention.
Figure 2:
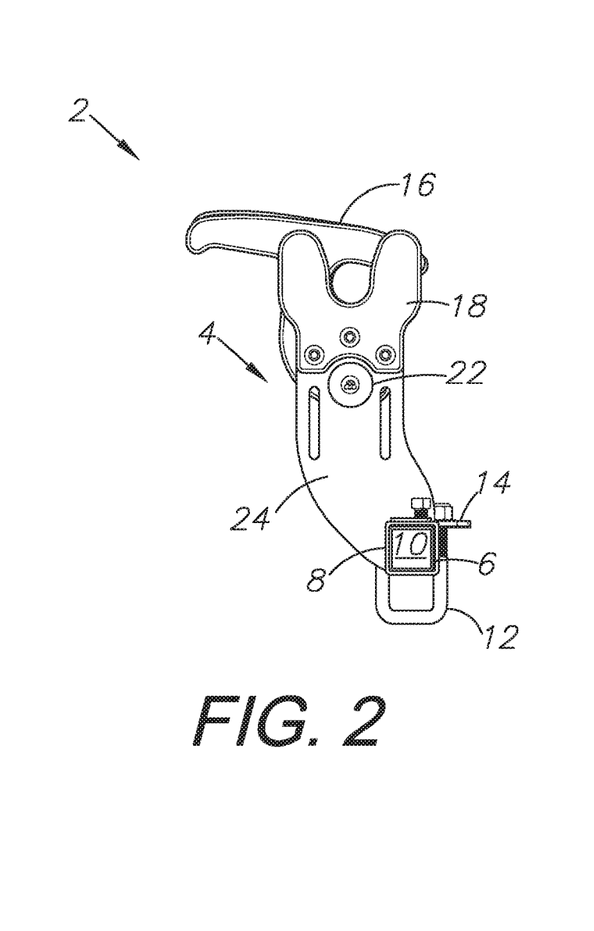
FIG. 2 is a right side elevational view thereof.
Figure 3:
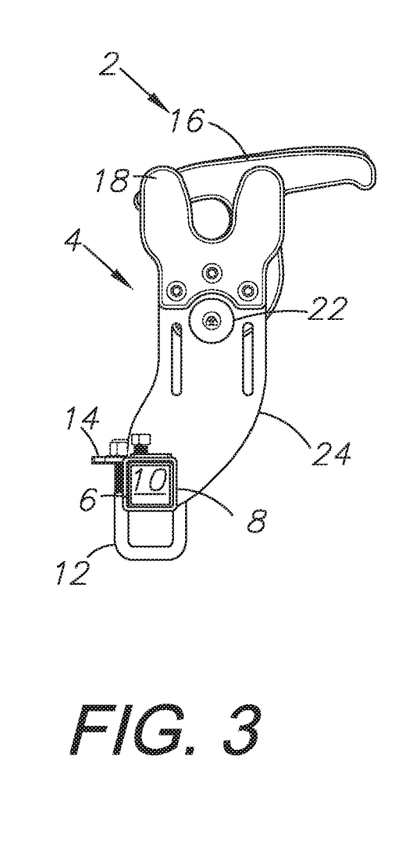
FIG. 3 is a left side elevational view thereof.
Figure 4:
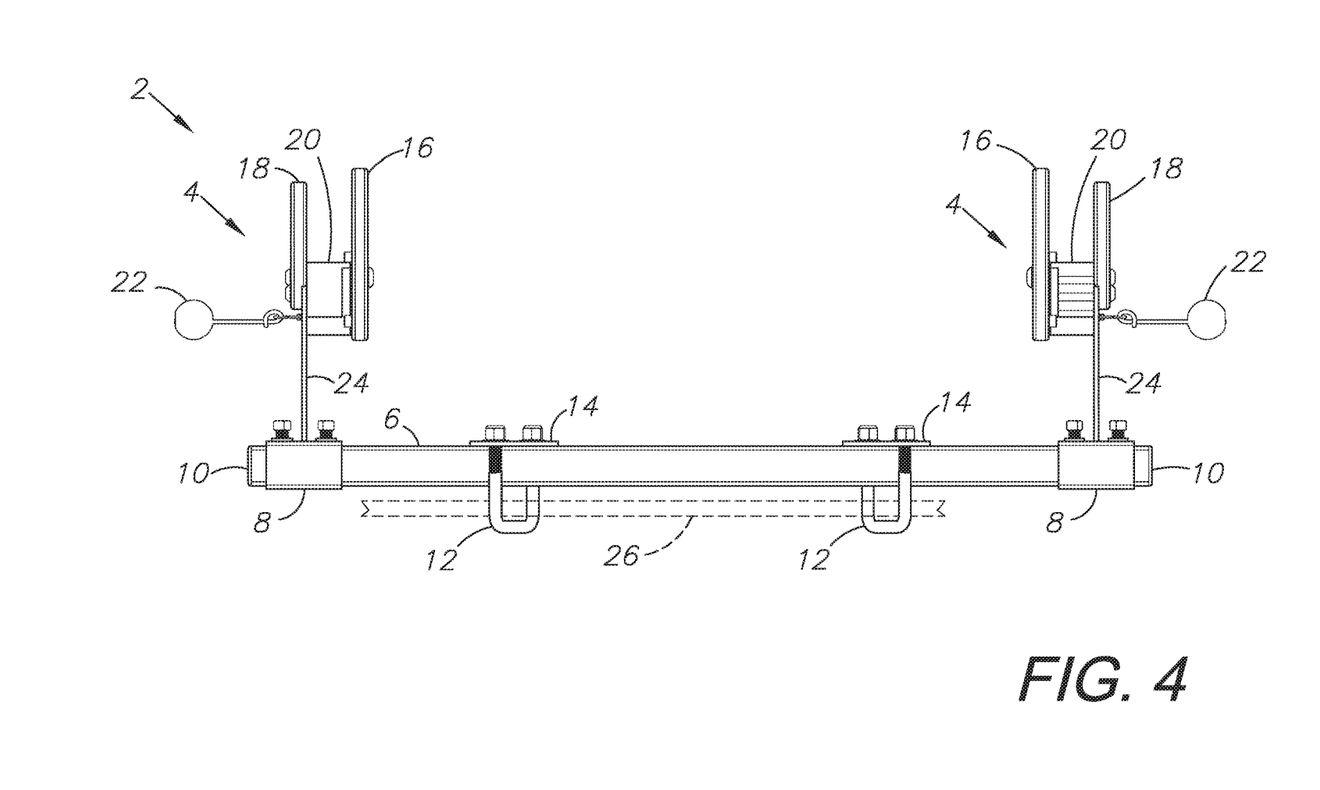
FIG. 4 is a front elevational view thereof.
Figure 5:
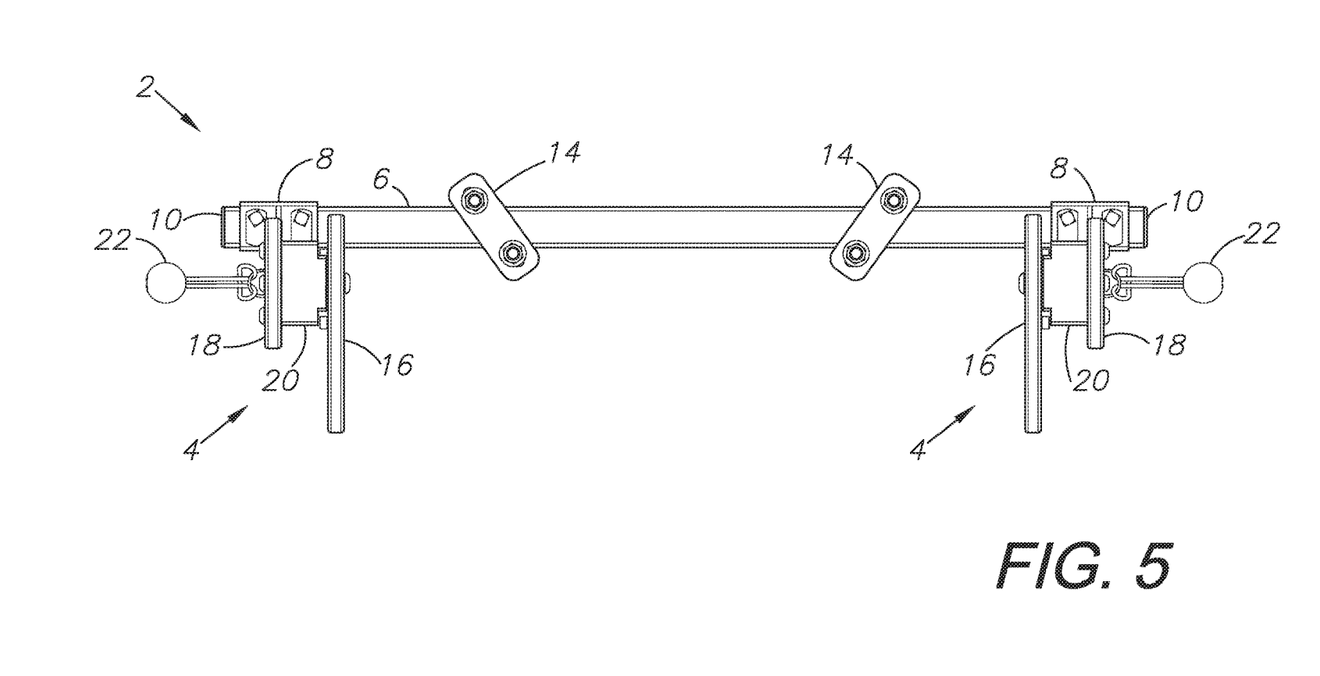
FIG. 5 is a top plan view thereof.

As shown in FIG. 1, the present invention is a tool carrier 2 for connecting to a vehicle or vehicle rack 26, as shown in FIG. 4, for the temporary storing of a tool 38, such as an ice auger. The purpose of the invention is to securely lock the tool 38 in place within the tool carrier 2 using a pair of clamp assemblies 4, and allowing for quick release of the tool when the tool is needed, and quick storage of the tool when work is complete.

The tool carrier 2 generally includes a base crossbar 6 which is secured to the vehicle or vehicle rack 26 by a pair of U-bolts 12 connected to a securing plate 14 by nuts, and a pair of clamp assemblies 4 each connected to the crossbar by a respective crossbar receiver 8 which is secured to the crossbar 6 by a locking bolt. The ends of the crossbar may be capped with end caps 10.

Figure 6:
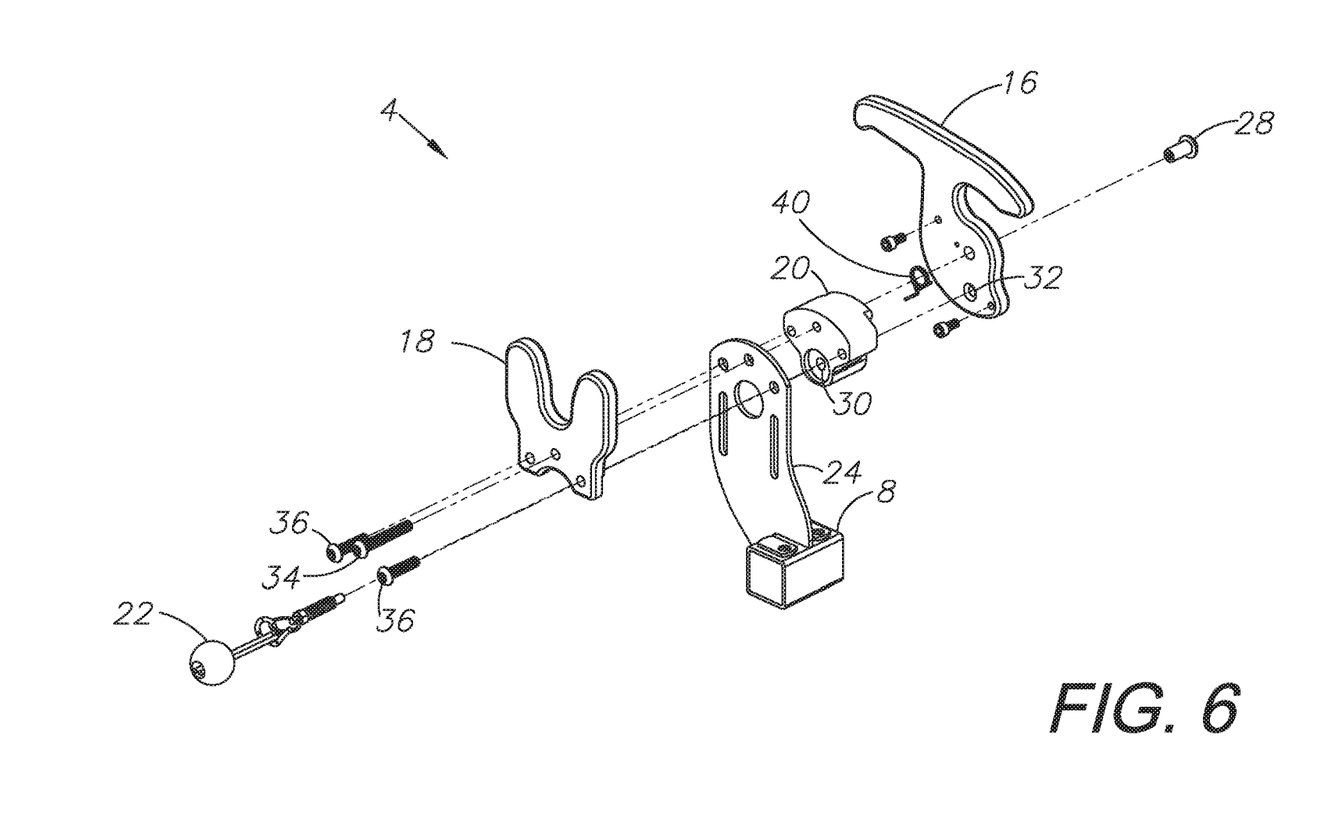
FIG. 6 is a three-dimensional exploded isometric view of a component of a preferred embodiment of the present invention from a first side view.
Figure 7:
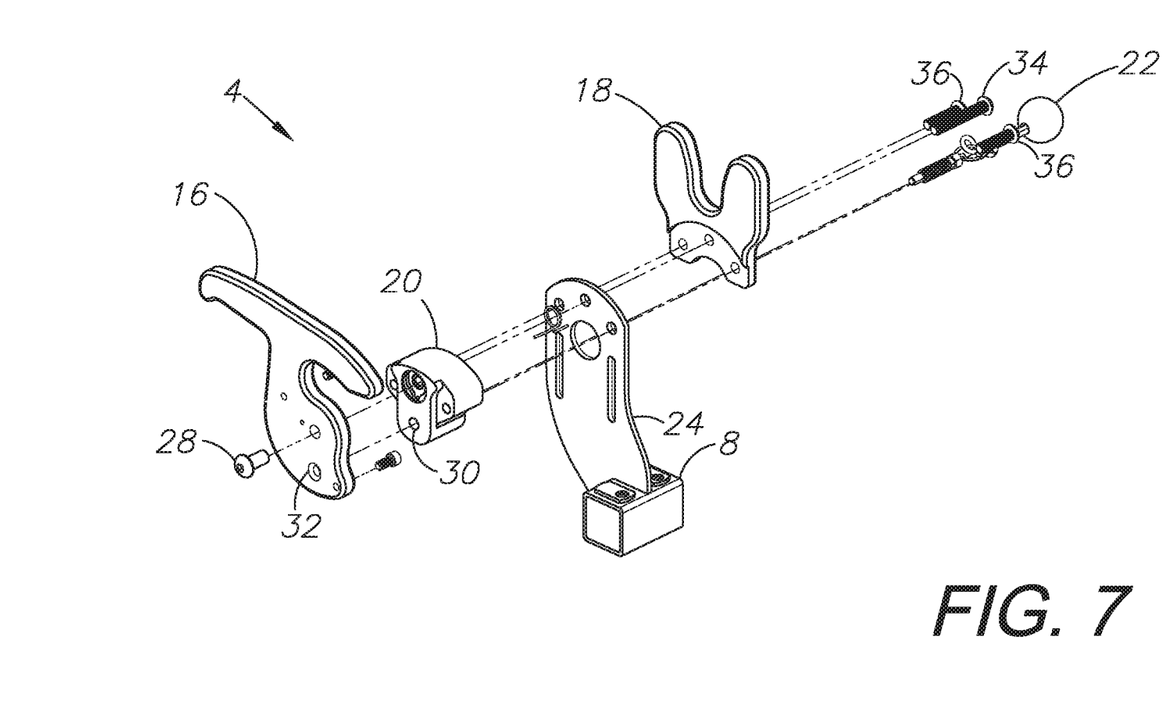
FIG. 7 is a three-dimensional exploded isometric view thereof from a second side view.
Figure 8:
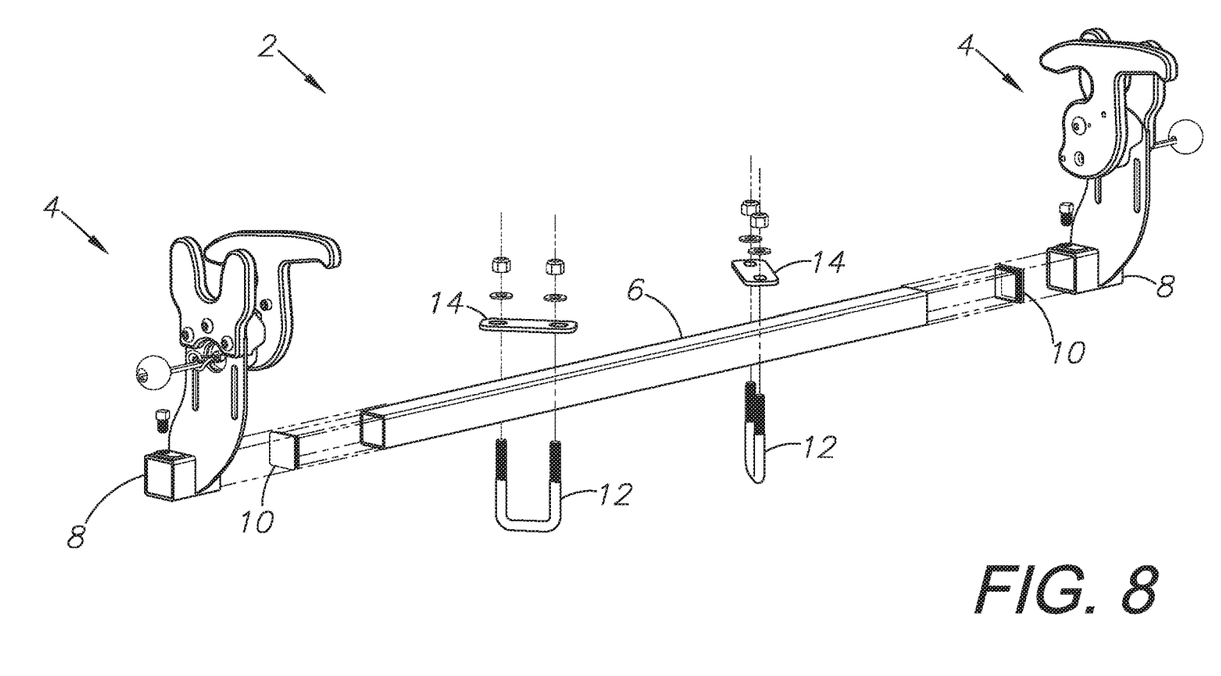
FIG. 8 is an exploded view of the three-dimensional isometric view of FIG. 1.

As shown in more detail in FIGS. 6-7, the clamp assemblies include a clamp 16, an auger clamp plate 18, a clamp block 20, a pull 22, and a slider bracket 24 which is connected to the crossbar receiver 8. A top bolt 34 and two side bolts 36 connect the auger clamp plate 18 clamp block 20 and slider bracket 24 together. The top bolt 34 is received by a bolt receiver 28 through the clamp 16 which also passes through a torsion spring 40 which allows the clamp 16 to rotate about the clamp block 20. The pull 22 is similarly threaded through the slider bracket 24 and the clamp block 20 via a clamp block pull receiver 30 and engages the clamp 16 in a clamp pull receiver 32. The pull 22 can be pulled on to manually release the clamp, allowing the tool 38 to be removed from the clamp. When the clamps are manually reengaged, the pull will automatically click back into the pull receiver 32 of the clamp 16, thereby locking the clamp in place about the tool.

In practice the present invention would be bolted to a mounting rack 26 of an all-terrain vehicle (ATV) or snowmobile via the mounting U-bolts 12 and securing plates 14, and an ice auger would be placed within the clamp assemblies 4 for easy transport to a place where the auger is to be used for work, such as a frozen lake. The user would pull on the pull 22 by the knob, which would disengage the clamps 16 automatically due to the torsion spring 40. When the user is finished using the ice auger, the auger is placed back within the clamp assemblies 40 and the clamps 16 are manually pushed back into place and locked into place by the pulls 22.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A tool carrier comprising:
   a crossbar configured to be affixed to a vehicle by a pair of mounting bolts and a respective pair of securing plates, said crossbar including a first end and a second end;
   a pair of clamp assemblies each connected to a respective on of said first end and said second end of said crossbar by a respective crossbar receiver;
   each of said pair of clamp assemblies comprising a slider bracket affixed to a respective crossbar receiver, a clamp, a clamp plate, and a clamp block;
   each of said pair of clamp assemblies further comprising a single top bolt threaded through said clamp plate, said slider bracket, said clamp block, a torsion spring, and said clamp and to be received by a bolt receiver, said top bolt configured to allow said clamp to pivot about said top bolt;
   each of said pair of clamp assemblies further including a pull lock threaded through said clamp plate, said slider bracket, said clamp block, and received within a pull receiver of said clamp;
   whereby said clamp is automatically moved to a disengaged position by said torsion spring by pulling said pull out of said pull receiver; and
   whereby said clamp is automatically locked in place by said pull by pushing said clamp into a locked position.

2. The tool carrier of claim 1, wherein said tool is an ice auger.

* * * * *